US011754017B2

(12) United States Patent
Tsubaki et al.

(10) Patent No.: US 11,754,017 B2
(45) Date of Patent: Sep. 12, 2023

(54) PISTON OF INTERNAL COMBUSTION ENGINE AND INTERNAL COMBUSTION ENGINE

(71) Applicant: MITSUBISHI HEAVY INDUSTRIES ENGINE & TURBOCHARGER, LTD., Sagamihara (JP)

(72) Inventors: Yoshitaka Tsubaki, Sagamihara (JP); Yusuke Imamori, Tokyo (JP); Satoshi Yamada, Tokyo (JP); Shintaro Shuto, Tokyo (JP); Taro Tamura, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/611,420

(22) PCT Filed: Jun. 30, 2020

(86) PCT No.: PCT/JP2020/025689
§ 371 (c)(1),
(2) Date: Nov. 15, 2021

(87) PCT Pub. No.: WO2021/006119
PCT Pub. Date: Jan. 14, 2021

(65) Prior Publication Data
US 2022/0213846 A1 Jul. 7, 2022

(30) Foreign Application Priority Data
Jul. 5, 2019 (JP) .................. 2019-125809

(51) Int. Cl.
*F02F 3/28* (2006.01)
(52) U.S. Cl.
CPC ..................... *F02F 3/28* (2013.01)

(58) Field of Classification Search
CPC ....... F02F 3/28; F02F 3/26; F02F 3/22; F02B 23/06; F02B 23/0678; F02B 23/0672;
(Continued)

(56) References Cited

U.S. PATENT DOCUMENTS 7,942,126 B2 * 5/2011 Zoller ................. F02B 23/0693
123/298
10,184,388 B1 1/2019 Ahmad
(Continued)

FOREIGN PATENT DOCUMENTS

CN      203717149 U    7/2014
CN      107795370 A    3/2018
(Continued)

OTHER PUBLICATIONS

International Search Report and Written Opinion for International Application No. PCT/JP2020/025689 dated Sep. 1, 2020.
(Continued)

*Primary Examiner* — Grant Moubry
(74) *Attorney, Agent, or Firm* — Birch, Stewart, Kolasch & Birch, LLP

(57) ABSTRACT

A piston of an internal combustion engine configured to be reciprocable along an axial direction in a cylinder includes a cavity formed to be recessed in a center of a piston top surface, and an outer circumferential edge portion located on a radially outer side of the cavity in the piston top surface. The cavity includes a lip portion, a raised portion, and a curved portion. The curved portion includes an outer circumference-side curved surface which includes a curved surface connected to the lip portion, an inner circumference-side concave surface which is located on a radially inner side of an outer circumference-side curved surface and includes a surface connected to a raised portion, the inner circumference-side concave surface including a deepest portion of (Continued)

the cavity, and a convex surface formed between the outer circumference-side curved surface and the inner circumference-side concave surface, as well as protruding upward.

7 Claims, 4 Drawing Sheets

(58) Field of Classification Search
CPC .. F02B 23/0696; F16J 1/00; F16J 1/09; Y02T 10/12
See application file for complete search history.

(56) References Cited

U.S. PATENT DOCUMENTS

| | | | |
|---|---|---|---|
| 2012/0234285 A1* | 9/2012 | Venugopal | F02B 23/0669 123/193.6 |
| 2015/0020765 A1* | 1/2015 | Pierpont | F02F 3/26 123/27 R |
| 2017/0082013 A1* | 3/2017 | Martinez | F02B 23/0669 |
| 2017/0096978 A1* | 4/2017 | Martinez | F02B 23/0693 |
| 2017/0159549 A1* | 6/2017 | Uehara | F02F 3/28 |
| 2017/0167459 A1* | 6/2017 | Martinez | F02M 61/182 |
| 2018/0058371 A1 | 3/2018 | Zhang | |
| 2019/0040789 A1* | 2/2019 | De Paola | F02B 23/0693 |
| 2019/0153976 A1* | 5/2019 | Díaz-Blanco | F02B 43/00 |
| 2020/0003147 A1* | 1/2020 | Shirahashi | F02B 23/0684 |
| 2020/0232380 A1* | 7/2020 | Kim | F02D 35/028 |
| 2020/0392919 A1* | 12/2020 | Kim | F02F 3/12 |

FOREIGN PATENT DOCUMENTS

| | | | | |
|---|---|---|---|---|
| DE | 102010030692 A1 | * | 2/2011 | .......... F02B 23/0651 |
| DE | 10 2011 056 218 A1 | | 6/2012 | |
| DE | 10 2014 005 138 A1 | | 10/2015 | |
| DE | 10 2016 122 500 A1 | | 6/2017 | |
| FR | 2 868 480 A1 | | 10/2005 | |
| JP | 54-81412 A | | 6/1979 | |
| JP | 04259624 A | * | 9/1992 | .......... F02B 23/0651 |
| JP | 2004-536992 A | | 12/2004 | |
| JP | 2007-51591 A | | 3/2007 | |
| JP | 2010-101244 A | | 5/2010 | |
| JP | 2016-520759 A | | 7/2016 | |
| JP | 2018-131942 A | | 8/2018 | |
| JP | 2018-193909 A | | 12/2018 | |
| WO | WO 03/010423 A1 | | 2/2003 | |
| WO | WO 2015/135699 A1 | | 9/2015 | |

OTHER PUBLICATIONS

Written Opinion of the International Searching Authority for International Application No. PCT/JP2020/025689, dated Dec. 2, 2021, with English translation.
Extended European Search Report for European Application No. 20836736.7, dated May 31, 2022.

* cited by examiner

PISTON OF INTERNAL COMBUSTION ENGINE AND INTERNAL COMBUSTION ENGINE

TECHNICAL FIELD

The present disclosure relates to a piston reciprocatingly housed in a cylinder, and an internal combustion engine including the above-described piston.

BACKGROUND

Conventionally, as an internal combustion engine, a reciprocating engine is known which includes a cylinder having a cylindrical hole portion, a piston reciprocatingly housed in the above-described hole portion of the cylinder, and an injection nozzle configured to inject a fuel to a combustion chamber divided by the cylinder and the piston.

As the combustion chamber of the reciprocating engine, a so-called reentrant type combustion chamber is known which has a cavity formed to be recessed in a center of a piston top surface, and includes a narrowing portion narrowing an opening of the cavity and a protruding portion disposed in the center of the cavity (see Patent Document 1, for example).

The cavity described in Patent Document 1 includes the protruding portion disposed in the center of the cavity, a curved portion disposed so as to encompass the above-described protruding portion, and a separating step portion disposed in the above-described protruding portion. The above-described curved portion is configured to guide, toward the protruding portion, a non-combusted fuel (fuel spray) which is injected from the injection nozzle disposed in the center of the combustion chamber toward a wall surface of the curved portion. The non-combusted fuel injected from the injection nozzle flows toward the protruding portion along the wall surface of the curved portion after reaching the wall surface of the curved portion. The non-combusted fuel injected from the injection nozzle loses kinetic energy by the injection and is decreased in fluidity as the non-combusted fuel flows along the wall surface of the curved portion, making it difficult to take in ambient oxygen. If the non-combusted fuel is combusted in the state where sufficient oxygen is not taken in the non-combusted fuel, soot may be generated.

The cavity described in Patent Document 1 separates the non-combusted fuel flowing along the wall surface of the curved portion and reaching the protruding portion from the wall surface of the protruding portion by the above-described separating step portion, thereby facilitating mixing of the non-combusted fuel decreased in fluidity and the ambient oxygen of the non-combusted fuel. The above-described cavity can combust the non-combusted fuel reaching the protruding portion in the state where sufficient oxygen is taken in the non-combusted fuel, making it possible to reduce a region having a high fuel concentration in the periphery of the protruding portion, and to suppress generation of soot in the periphery of the protruding portion.

CITATION LIST

Patent Literature

Patent Document 1: JP2018-131942A

SUMMARY

Technical Problem

The separating step portion in Patent Document 1 is disposed on a radially inner side of a deepest portion of the cavity and above the above-described deepest portion in a cross-section including the axis of the piston. Thus, the wall surface of the curved portion includes, between the deepest portion of the cavity and the separating step portion, an inclined surface which is inclined to gradually be raised radially inward from the deepest portion of the cavity. In the cavity described in Patent Document 1, the non-combusted fuel injected from the injection nozzle and flowing along the wall surface of the curved portion may be accumulated between the deepest portion of the cavity and the separating step portion without being able to move beyond the above-described inclined surface, and the region having the high fuel concentration may occur between the deepest portion of the cavity and the separating step portion. If the region having the high fuel concentration described above widely occurs, generation of soot may be accelerated or combustion efficiency may be decreased.

In view of the above issues, an object of at least one embodiment of the present invention is to provide a piston of an internal combustion engine capable of suppressing generation of soot and capable of improving combustion efficiency.

Solution to Problem (1) A piston of an internal combustion engine according to at least one embodiment of the present invention is a piston of an internal combustion engine configured to be reciprocable along an axial direction in a cylinder, the piston of the internal combustion engine including a cavity formed to be recessed in a center of a piston top surface, and an outer circumferential edge portion located on a radially outer side of the above-described cavity in the above-described piston top surface. The above-described cavity includes a lip portion which has an inclined surface extending obliquely downward from the above-described outer circumferential edge portion toward a radially inner side, a raised portion protruding upward from a bottom of the above-described cavity, and a curved portion connecting the above-described raised portion and the above-described lip portion. The above-described curved portion includes an outer circumference-side curved surface which includes a curved surface connected to the above-described lip portion, an inner circumference-side concave surface which is located on the radially inner side of the above-described outer circumference-side curved surface and includes a surface connected to the above-described raised portion, the inner circumference-side concave surface including a deepest portion of the above-described cavity, and a convex surface formed between the above-described outer circumference-side curved surface and the above-described inner circumference-side concave surface, as well as protruding upward.

With the above configuration (1), the curved portion of the piston includes the outer circumference-side curved surface which includes the curved surface connected to the lip portion, the inner circumference-side concave surface which is located on the radially inner side of the outer circumference-side curved surface, includes the surface connected to the raised portion, and includes the deepest portion of the cavity, and the convex surface formed between the outer circumference-side curved surface and the inner circumference-side concave surface, as well as protruding upward. That is, the convex surface is disposed on the radially outer side of the raised portion and the deepest portion of the cavity, in the cross-section including the axis of the piston. Thus, the piston including the cavity with the above-described curved portion can cause a non-combusted fuel injected from an injection nozzle and flowing toward the raised portion along the outer circumference-side curved surface to reach the convex surface before kinetic energy by the injection is lost, making it possible to prevent accumulation of the non-combusted fuel in the space facing the inner circumference-side concave surface located on the radially outer side of the convex portion. By preventing accumulation of the non-combusted fuel in the space facing the inner circumference-side concave surface, it is possible to suppress occurrence of a region having a high fuel concentration. Thus, it is possible to suppress generation of soot, and to improve combustion efficiency in a combustion chamber.

Further, with the above configuration (1), since the inner circumference-side concave surface includes the surface connected to the raised portion, it is possible to facilitate introduction of a combustion gas into the space facing the inner circumference-side concave surface from the center of the combustion chamber along the raised portion. The curved portion including the inner circumference-side concave surface described above can cause the non-combusted fuel separated from the curved portion by the convex surface to sufficiently take in the combustion gas in the space facing the above-described inner circumference-side concave surface, making it possible to effectively suppress generation of soot.

(2) In some embodiments, in the piston of the internal combustion engine according to the above configuration (1), the above-described inner circumference-side concave surface includes an inner circumference-side curved surface curved downward into a concave shape.

With the above configuration (2), since the inner circumference-side concave surface includes the inner circumference-side curved surface curved downward into the concave shape, it is possible to encourage the combustion gas flowing from the center of the combustion chamber along the raised portion to smoothly flow along the inner circumference-side curved surface. Since the curved portion having the inner circumference-side curved surface described above can introduce, into the non-combusted fuel separated from the curved portion by the convex surface, the combustion gas along a direction intersecting with a flow direction of the above-described separated non-combusted fuel, it is possible to cause the above-described separated non-combusted fuel to efficiently take in the combustion gas, and to effectively suppress generation of soot.

(3) In some embodiments, in the piston of the internal combustion engine according to the above configuration (1) or (2), the above-described lip portion has a lip-side convex curved surface which includes a surface connected to the above-described inclined surface, the lip-side convex curved surface projecting radially inward relative to the above-described inclined surface.

With the above configuration (3), the lip-side convex curved surface includes the surface connected to the inclined surface and projects radially inward relative to the inclined surface. The lip portion having the above-described lip-side convex curved surface can divide the flow of the non-combusted fuel injected from the injection nozzle without decreasing the flow velocity of the non-combusted fuel very much, making it possible to efficiently propagate the non-combusted fuel into the combustion chamber. Further, the lip portion having the above-described lip-side convex curved surface can form a section including the above-described lip-side convex curved surface into a thick shape, making it possible to ensure a strength capable of withstanding a heat load applied by the non-combusted fuel injected from the injection nozzle.

(4) In some embodiments, in the piston of the internal combustion engine according to any one of the above configurations (1) to (3), the piston of the internal combustion engine is configured such that the above-described convex surface is located on the radially inner side of an inner circumferential end of the above-described lip portion.

With the above configuration (4), since the piston of the internal combustion engine is configured such that the convex surface is located on the radially inner side of the inner circumferential end of the lip portion, as compared with a case where the convex surface is located on the radially outer side of the inner circumferential end of the lip portion, the non-combusted fuel injected from the injection nozzle can flow along the outer circumference-side curved surface over a long distance. Thus, it is possible to effectively use the combustion gas in a space facing the outer circumference-side curved surface in the combustion chamber for combustion.

(5) In some embodiments, in the piston of the internal combustion engine according to any one of the above configuration (1) to (4), the above-described outer circumference-side curved surface has a maximum inner diameter D2 which is not greater than 0.7D1, where D1 is an outer diameter of the above-described piston.

With the above configuration (5), the maximum inner diameter D2 of the outer circumference-side curved surface is not greater than 0.7D1, where D1 is the outer diameter of the piston. Thus, it is possible to provide a cooling passage, where a cooling liquid flows, on the radially outer side of the outer circumference-side curved surface in the piston. Providing the above-described cooling passage for the piston, it is possible to cool a slide portion with the piston, in particular, the cylinder by the liquid in the cooling passage. Thus, a higher output of the internal combustion engine is possible.

(6) In some embodiments, in the piston of the internal combustion engine according to any one of the above configuration (1) to (5), the outer diameter D1 of the above-described piston is not less than 160 mm and not greater than 190 mm.

With the above configuration (6), the outer diameter D1 of the piston is not less than 160 mm and not greater than 190 mm. The piston with the outer diameter D1 satisfying the above-described condition is generally mounted on an internal combustion engine which is larger than an internal combustion engine for bicycle. As the combustion chamber of the internal combustion engine is large, a possibility for the non-combusted fuel injected from a combustion nozzle and flowing along the curved portion to reach the raised portion is low, and a possibility of occurrence of the region having the high fuel concentration in the space facing the curved portion is high. Even the piston with the outer diameter D1 satisfying the above-described condition, with the piston having the configuration according to the above configuration (1), it is possible to suppress occurrence of the region having the high fuel concentration in the space facing the curved portion. Thus, it is possible to suppress generation of soot, and to improve combustion efficiency in the combustion chamber.

(7) In some embodiments, in the piston of the internal combustion engine according to any one of the above configurations (1) to (6), the above-described inner circumference-side concave surface includes an inner circumference-side curved surface curved downward into a concave shape, and the above-described inner circumference-side curved surface is configured to have a larger curvature than the above-described outer circumference-side curved surface.

With the above configuration (7), since the inner circumference-side curved surface is configured to have the larger curvature than the outer circumference-side curved surface, as compared with a case where the inner circumference-side curved surface is configured to have a smaller curvature than the outer circumference-side curved surface, it is possible to increase the volume of the space facing the inner circumference-side curved surface, and to fill the above-described space with a large amount of combustion gas. Filling the above-described space with the large amount of combustion gas, it is possible to facilitate mixing of the combustion gas filling the above-described space with the non-combusted fuel separated from the curved portion by the convex surface. Thus, the inner circumference-side curved surface having the larger curvature than the outer circumference-side curved surface can cause the above-described separated non-combusted fuel to sufficiently take in the combustion gas, making it possible to effectively suppress generation of soot.

(8) An internal combustion engine according to at least one embodiment of the present invention includes a cylinder, the piston according to any one of the above configurations (1) to (7), and an injection nozzle configured to inject a fuel to a combustion chamber divided by the above-described cylinder and the above-described piston.

With the above configuration (8), since the internal combustion engine includes the piston having the above configuration (1), it is possible to suppress occurrence of the region having the high fuel concentration in the space facing the curved portion. Thus, it is possible to suppress generation of soot, and to improve combustion efficiency.

Advantageous Effects

According to at least one embodiment of the present invention, provided is a piston of an internal combustion engine capable of suppressing generation of soot and capable of improving combustion efficiency.

DETAILED DESCRIPTION

Figure 1:
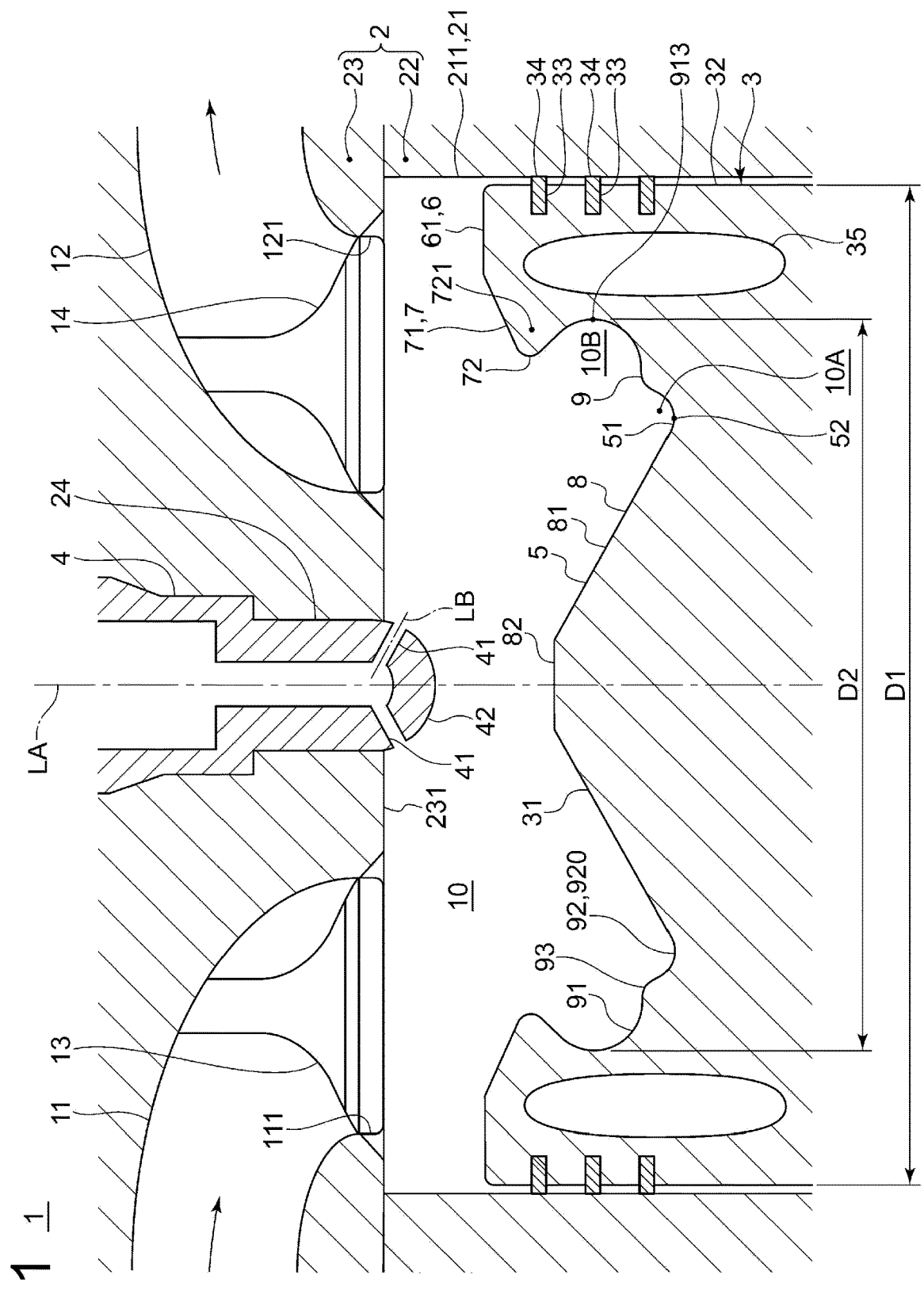
FIG. 1 is a schematic cross-sectional view of an internal combustion engine including a piston according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

FIG. 1 is a schematic cross-sectional view of an internal combustion engine including a piston according to an embodiment of the present invention. FIG. 1 shows a state in which the piston is located in the vicinity of a compression top dead center.

As shown in FIG. 1, an internal combustion engine 1 according to some embodiments includes a cylinder 2 which has a cylindrical hole portion 21 extending along the axial direction (an extension direction of an axis LA of a piston 3, the vertical direction in FIG. 1), a piston 3 disposed in the hole portion 21 of the cylinder 2 and configured to be reciprocable along the above-described axial direction, and an injection nozzle 4 configured to inject a fuel to a combustion chamber 10 divided by the cylinder 2 and the piston 3. That is, the internal combustion engine 1 includes a reciprocating engine.

In the illustrated embodiment, as shown in FIG. 1, the cylinder 2 includes a cylinder block 22 having at least one cylindrical hole portion 21 described above, and a cylinder head 23 disposed on the cylinder block 22 so as to fill the top of the cylindrical hole portion 21.

The above-described combustion chamber 10 is divided by a top surface 31 of the piston 3 (piston top surface), a bottom surface 231 of the cylinder head 23 disposed opposite to the above-described top surface 31, and an inner wall surface 211 of the hole portion 21 of the cylinder block 22.

Hereinafter, in the axial direction, a side (an upper side in the drawing) where the bottom surface 231 of the cylinder head 23 is located relative to the top surface 31 of the piston 3 will be referred to as an upside, and a side (a lower side in the drawing) where the top surface 31 of the piston 3 is located relative to the bottom surface 231 of the cylinder head 23 will be referred to as a downside.

As with a general piston of an internal combustion engine, the piston 3 is coupled to a crank shaft located below the piston 3 via a con rod. As shown in FIG. 1, the piston 3 includes at least one (three in the drawing) ring groove 33 annularly formed in an outer circumferential surface 32 along the circumferential direction around the axis LA. The ring groove 33 is mounted with a piston ring 34.

In the illustrated embodiment, the injection nozzle 4 includes an injector configured to inject a liquid fuel into a spray. The internal combustion engine 1 is configured such that the liquid fuel (non-combusted fuel) is injected from an injection hole 41 of the injection nozzle 4 to a combustion gas filling the combustion chamber 10, thereby causing the liquid fuel to be mixed with the combustion gas and to have self-ignition in the combustion chamber 10. That is, the internal combustion engine 1 in the illustrated embodiment includes a diesel engine.

In some other embodiments, the internal combustion engine 1 may be configured to inject a fuel gas (gas fuel) from the injection hole 41 of the injection nozzle 4, or may be configured to ignite (light) the non-combusted fuel by an ignition device such as a spark plug.

In the illustrated embodiment, the injection nozzle 4 is mounted in the cylinder block 22. The injection nozzle 4 is inserted in a nozzle insertion hole 24 formed in the cylinder block 22, and one end portion 42 having the at least one injection hole 41 protrudes downward from the bottom surface 231 of the cylinder head 23. The injection nozzle 4 is disposed at the center of the combustion chamber 10 in the radial direction. In the embodiment shown in FIG. 1, the injection nozzle 4 is disposed on a straight line obtained by extending the axis LA of the piston 3.

In the illustrated embodiment, as shown in FIG. 1, the internal combustion engine 1 further includes an intake port 11 (intake passage) for sending the combustion gas from the outside of the combustion chamber 10 to the combustion chamber 10, an exhaust port 12 (exhaust passage) for discharging an exhaust gas from the combustion chamber 10 to the outside of the combustion chamber 10, an intake valve 13 for opening/closing the intake port 11, and an exhaust valve 14 for opening/closing the exhaust port 12. As the combustion gas, air containing oxygen can be given as an example.

The internal combustion engine 1 may be configured to introduce, as the above-described air (combustion gas), compressed air compressed by a compressor to have a pressure lower than an atmospheric pressure to the combustion chamber 10, or may be configured to introduce atmospheric pressure air.

In the embodiment shown in FIG. 1, the intake port 11 and the exhaust port 12 are each disposed in the cylinder head 23. The intake port 11 communicates with the combustion chamber 10 via an intake hole 111 opening to the bottom surface 231 of the cylinder head 23. The exhaust port 12 communicates with the combustion chamber 10 via an exhaust hole 121 opening to the bottom surface 231 of the cylinder head 23.

Opening/closing the intake valve 13 and the exhaust valve 14 before the non-combusted fuel is injected from the injection nozzle 4, the combustion gas sent to the combustion chamber 10 through the intake port 11 fills the combustion chamber 10. The non-combusted fuel injected from the injection nozzle 4 is mixed with the combustion gas filling the combustion chamber 10, and then combusted in the combustion chamber 10. The exhaust gas having been combusted in the combustion chamber 10 is discharged to the outside of the internal combustion engine 1 through the exhaust port 12.

Figure 2:
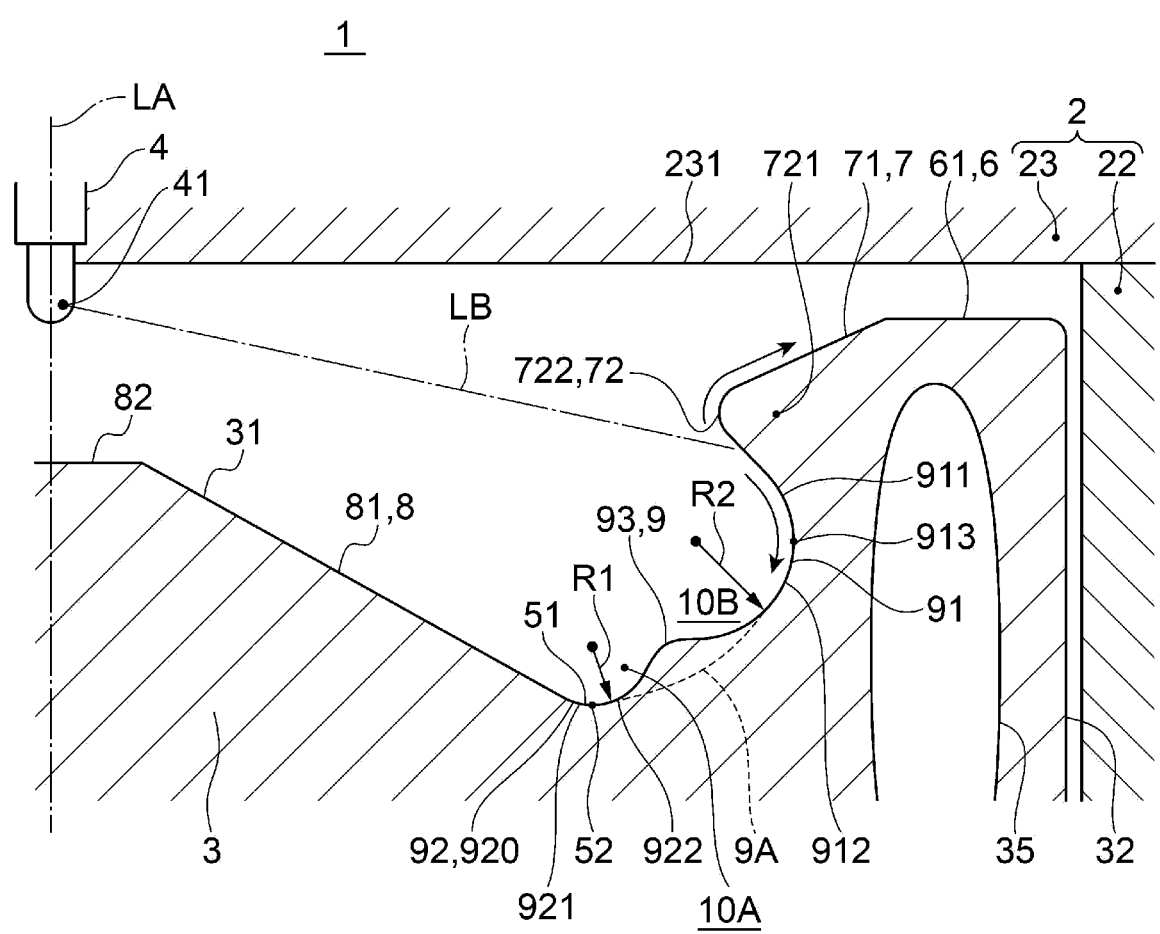
FIG. 2 is a partially enlarged view of the internal combustion engine shown in FIG. 1.
Figure 3:
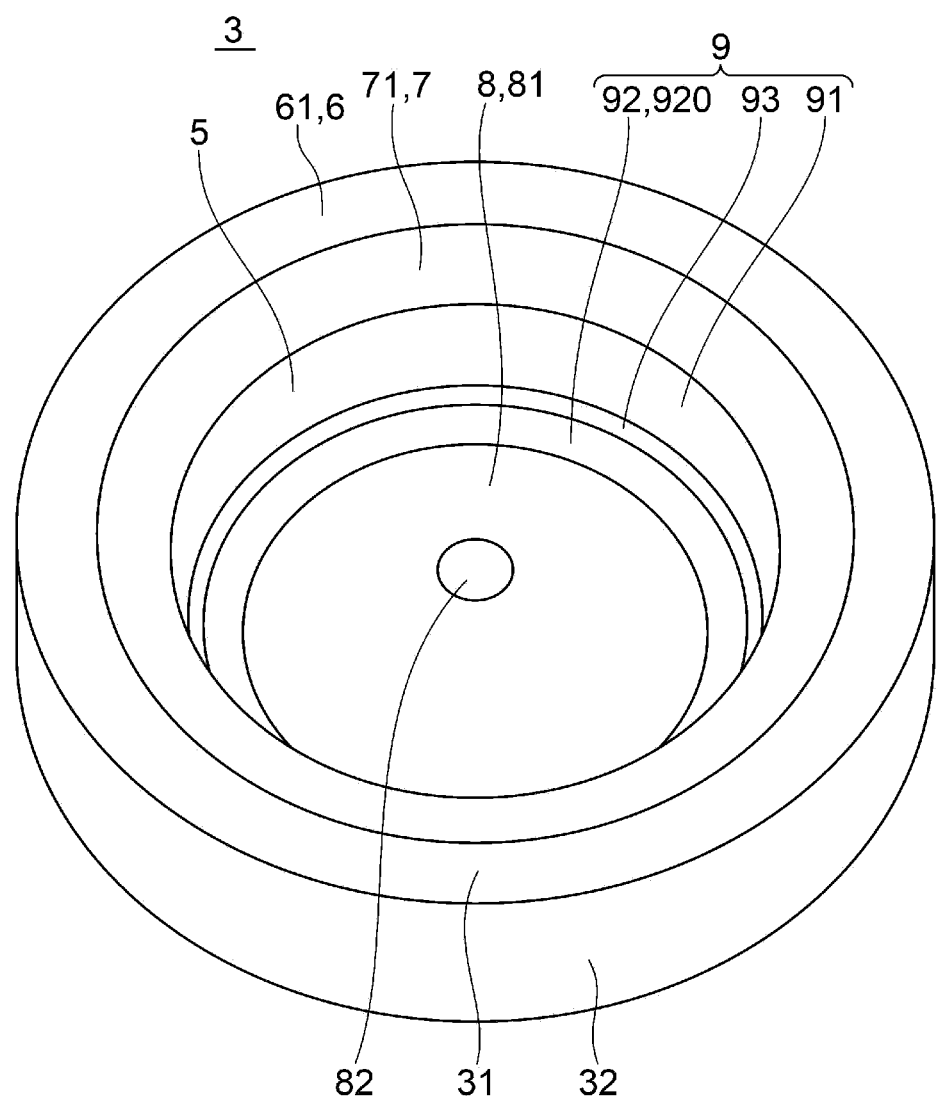
FIG. 3 is a schematic perspective view of the piston according to an embodiment of the present invention.
Figure 4:
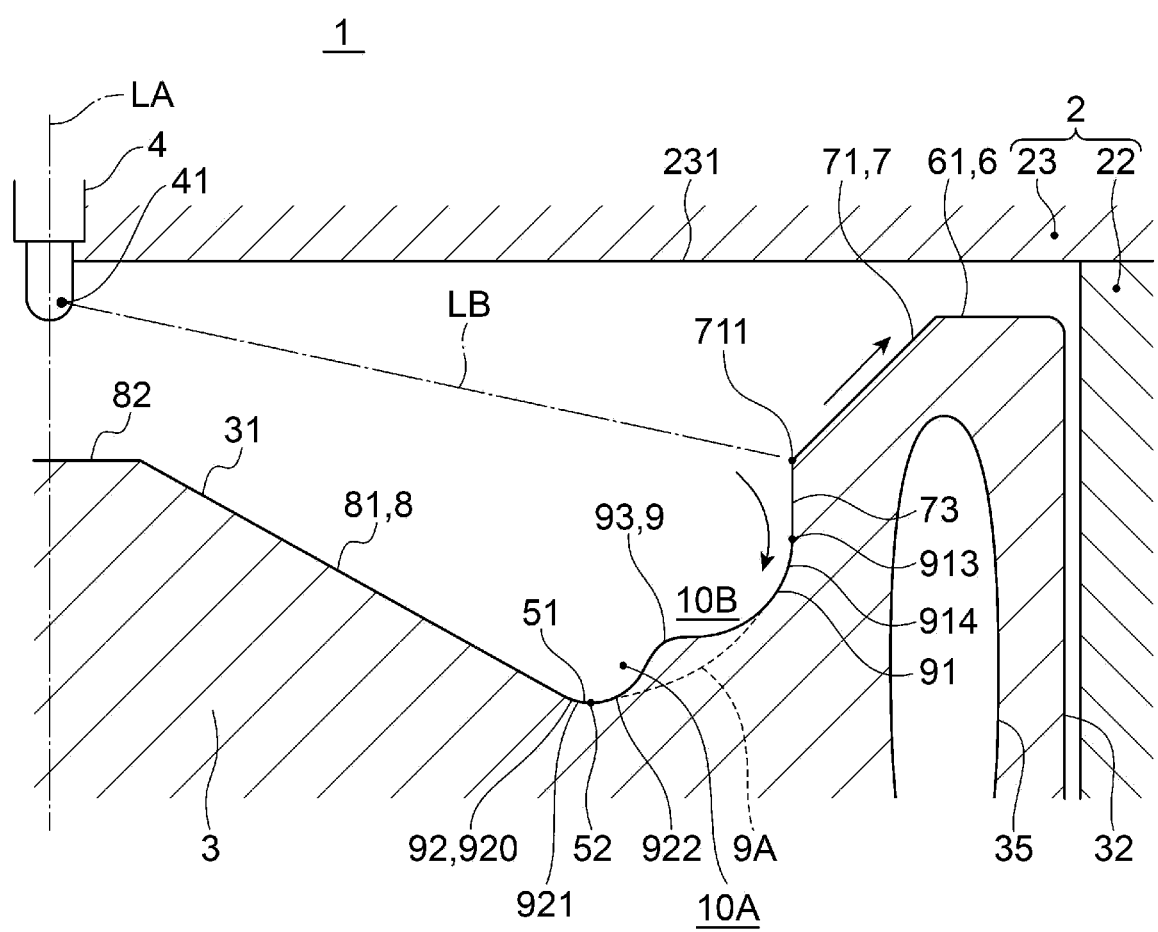
FIG. 4 is a partially enlarged view corresponding to FIG. 2 of the internal combustion engine including the piston according to another embodiment of the present invention.

FIG. 2 is a partially enlarged view of the internal combustion engine shown in FIG. 1. FIG. 3 is a schematic perspective view of the piston according to an embodiment of the present invention. FIG. 4 is a partially enlarged view corresponding to FIG. 2 of the internal combustion engine including the piston according to another embodiment of the present invention. As shown in FIGS. 1 to 4, the piston 3 includes a cavity 5 formed to be recessed in the center of the top surface 31 of the piston 3, and an outer circumferential edge portion 6 located on the radially outer side of the cavity 5 in the top surface 31 of the piston 3.

In the illustrated embodiment, as shown in FIG. 2, 4, the outer circumferential edge portion 6 has a plane surface 61 extending along a direction intersecting with (orthogonal to) the axis LA and extending along the circumferential direction. In the embodiment shown in FIG. 3, the plane surface 61 (outer circumferential edge portion 6) is annularly formed.

As shown in FIGS. 1 to 4, the cavity 5 includes a lip portion 7 which has an inclined surface 71 extending obliquely downward from the outer circumferential edge portion 6 toward the radially inner side, a raised portion 8 protruding upward from a bottom 51 of the cavity 5, and a curved portion 9 connecting the raised portion 8 and the lip portion 7. The inclined surface 71 (lip portion 7) extends along the circumferential direction. In the embodiment shown in FIG. 3, the inclined surface 71 (lip portion 7) is annularly formed.

In the illustrated embodiment, as shown in FIG. 2, 4, the raised portion 8 is formed into a cone shape. The raised portion 8 includes, in a cross-section including the axis LA, an inclined surface 81 linearly extending radially inward from the curved portion 9 along the direction intersecting with the axis LA, and a ceiling surface 82 extending at an upper end of the inclined surface 81 along the direction intersecting with (orthogonal to) the axis LA. The ceiling surface 82 is disposed on the axis of the axis LA and is opposite to the one end portion 42 of the injection nozzle 4.

As shown in FIG. 2, 4, the above-described injection nozzle 4 is configured to inject the non-combusted fuel from the injection hole 41 toward the lip portion 7 of the piston 3. In the illustrated embodiment, an axis LB of the injection hole 41 of the injection nozzle 4 extends toward the lip portion 7. A plurality of injection holes 41 are disposed along the circumferential direction.

The flow of the non-combusted fuel injected from the injection hole 41 of the injection nozzle 4 is vertically divided into two directions by the lip portion 7. A part of the non-combusted fuel flows toward a space facing the plane surface 61 of the outer circumferential edge portion 6 along the inclined surface 71 of the lip portion 7. A remaining part of the non-combusted fuel flows toward the raised portion 8 along the curved portion 9.

As shown in FIGS. 1 to 4, the piston 3 according to some embodiments includes the above-described cavity 5 including the lip portion 7, the raised portion 8, and the curved portion 9, and the above-described outer circumferential edge portion 6. As shown in FIG. 2, 4, the above-described curved portion 9 includes an outer circumference-side curved surface 91, an inner circumference-side concave surface 92 located on the radially inner side of the outer circumference-side curved surface 91, and a convex surface 93 formed between the outer circumference-side curved surface 91 and the inner circumference-side concave surface 92, as well as protruding upward.

In the illustrated embodiment, as shown in FIG. 3, the outer circumference-side curved surface 91, the inner circumference-side concave surface 92, and the convex surface 93 each extend along the circumferential direction. In the embodiment shown in FIG. 3, the outer circumference-side curved surface 91, the inner circumference-side concave surface 92, and the convex surface 93 are each annularly formed. In some other embodiments, the outer circumference-side curved surface 91, the inner circumference-side concave surface 92, and the convex surface 93 may each be formed into an arc shape.

In the embodiment shown in FIG. 2, the outer circumference-side curved surface 91 includes a curved surface 911 connected to the lip portion 7. The curved surface 911 (lip portion-side curved surface) is curved obliquely downward into a concave shape from the lip portion 7 toward the radially outer side. The outer circumference-side curved surface 91 further includes a curved surface 912 connected to the convex surface 93. The curved surface 912 (convex surface-side curved surface) is curved obliquely upward into a concave shape from the convex surface 93 toward the radially outer side.

In the embodiment shown in FIG. 4, the outer circumference-side curved surface 91 includes a curved surface 914 connected to the lip portion 7 and the convex surface 93. The curved surface 914 is curved obliquely downward into a concave shape from the lip portion 7 toward the radially inner side. In other words, the curved surface 914 is curved obliquely upward into the concave shape from the convex surface 93 toward the radially outer side.

In the embodiment shown in FIG. 2, 4, the inner circumference-side concave surface 92 includes a deepest portion 52 of the cavity 5, and includes a surface 921 connected to the raised portion 8. The surface 921 (raised portion-side surface) is curved into a concave shape from the raised portion 8 toward the radially outer side. The inner circumference-side concave surface 92 further includes a surface 922 connected to the convex surface 93. The surface 922 (convex surface-side surface) is curved obliquely upward into a concave shape from the deepest portion 52 of the surface 921 toward the radially outer side. The deepest portion 52 of the cavity 5 is disposed at a boundary between the surface 921 and the surface 922.

In some other embodiments, at least one of the surface 921 and the surface 922 may be a flat surface linearly extending in the cross-section including the axis LA, or may be curved into a convex shape.

As a comparative example of the curved portion 9, a curved portion 9A without the above-described convex surface 93 is indicated by a dotted line in FIG. 2, 4. If the cavity 5 of the piston includes the curved portion 9A without the above-described convex surface 93, the non-combusted fuel flowing radially inward along the curved portion 9A may be accumulated in a space, which corresponds to a space 10A facing the inner circumference-side concave surface 92, without being able to move beyond the raised portion 8, and a region having a high fuel concentration may occur. In the region having the high fuel concentration, combustion is performed in a state where mixing of the non-combusted fuel and the combustion gas is insufficient, which may generate soot or decrease combustion efficiency.

According to the above configuration, as shown in FIG. 2, 4, the curved portion 9 of the piston 3 includes the above-described outer circumference-side curved surface 91 which includes the curved surface 911 or the curved surface 914 connected to the lip portion 7, the above-described inner circumference-side concave surface 92 which is located on the radially inner side of the outer circumference-side curved surface 91, includes the surface 921 connected to the raised portion 8, and includes the deepest portion 52 of the cavity 5, and the above-described convex surface 93 formed between the outer circumference-side curved surface 91 and the inner circumference-side concave surface 92, as well as protruding upward. That is, as shown in FIG. 2, 4, the convex surface 93 is disposed on the radially outer side of the raised portion 8 and the deepest portion 52 of the cavity 5, in the cross-section including the axis LA of the piston 3. Thus, the piston 3 including the cavity 5 with the curved portion 9 can cause the non-combusted fuel injected from the injection nozzle 4 and flowing toward the raised portion 8 along the outer circumference-side curved surface 91 to reach the convex surface 93 before kinetic energy by the injection is lost, making it possible to prevent accumulation of the non-combusted fuel in the space 10A facing the inner circumference-side concave surface 92 located on the radially outer side of the convex surface 93. By preventing accumulation of the non-combusted fuel in the space 10A facing the inner circumference-side concave surface 92, it is possible to suppress occurrence of the region having the high fuel concentration. Thus, it is possible to suppress generation of soot, and to improve combustion efficiency in the combustion chamber 10.

Further, according to the above configuration, since the inner circumference-side concave surface 92 includes the surface 921 connected to the raised portion 8, it is possible to facilitate introduction of the combustion gas into the space 10A facing the inner circumference-side concave surface 92 from the center of the combustion chamber 10 along the raised portion 8. The curved portion 9 including the inner circumference-side concave surface 92 described above can cause the non-combusted fuel separated from the curved portion 9 by the convex surface 93 to sufficiently take in the combustion gas in the space 10A facing the inner circumference-side concave surface 92, making it possible to effectively suppress generation of soot.

In some embodiments, as shown in FIG. 2, 4, the above-described inner circumference-side concave surface 92 includes an inner circumference-side curved surface 920 curved downward into a concave shape. That is, the inner circumference-side curved surface 920 includes the above-described surface 921 (raised portion-side surface) curved into the concave shape from the above-described raised portion 8 toward the radially outer side, and the above-described surface 922 (convex surface-side surface) connected to the convex surface 93 and curved obliquely upward into the concave shape from the deepest portion 52 of the surface 921 toward the radially outer side. The surface 922 in the inner circumference-side curved surface 920 is connected to the surface 921, and has the same curvature as the surface 921.

According to the above configuration, since the inner circumference-side concave surface 92 includes the inner circumference-side curved surface 920 curved downward into the concave shape, it is possible to encourage the combustion gas flowing from the center of the combustion chamber 10 along the raised portion 8 to smoothly flow along the inner circumference-side curved surface 920. Since the curved portion 9 having the inner circumference-side curved surface 920 described above can introduce, into the non-combusted fuel separated from the curved portion 9 by the convex surface 93, the combustion gas along the direction intersecting with a flow direction of the above-described separated non-combusted fuel, it is possible to cause the above-described separated non-combusted fuel to efficiently take in the combustion gas, and to effectively suppress generation of soot.

In some embodiments, as shown in FIG. 2, the above-described inner circumference-side curved surface 920 is configured to have a larger curvature than the above-described outer circumference-side curved surface 91. That is, a curvature R1 of the inner circumference-side curved surface 920 is larger than a curvature R2 of the outer circumference-side curved surface 91. The outer circumference-side curved surface 91 includes the above-described curved surface 911, and the above-described curved surface 912 connected to the curved surface 911 and having the same curvature as the curved surface 911.

According to the above configuration, since the inner circumference-side curved surface 920 is configured to have the larger curvature than the outer circumference-side curved surface 91, as compared with a case where the inner circumference-side curved surface 920 is configured to have a smaller curvature than the outer circumference-side curved surface 91, it is possible to increase the volume of the space 10A facing the inner circumference-side curved surface 920, and to fill the above-described space 10A with a large amount of combustion gas. Filling the above-described space 10A with the large amount of combustion gas, it is possible to facilitate mixing of the combustion gas filling the space 10A with the non-combusted fuel separated from the curved portion 9 by the convex surface 93. Thus, the inner circumference-side curved surface 920 having the larger curvature than the outer circumference-side curved surface 91 can cause the above-described separated non-combusted fuel to sufficiently take in the combustion gas, making it possible to effectively suppress generation of soot.

In some embodiments, as shown in FIG. 2, the above-described inner circumference-side curved surface 920 is configured to have a shorter arc length in the cross-section including the axis LA than the above-described outer circumference-side curved surface 91. In this case, it is possible to immediately mix the combustion gas flowing from the center of the combustion chamber 10 along the raised portion 8 with the non-combusted fuel separated from the curved portion 9 by the convex surface 93, making it possible to facilitate mixing of the combustion gas filling the space 10A with the non-combusted fuel separated from the curved portion 9 by the convex surface 93.

In some embodiments, as shown in FIG. 2, the above-described lip portion 7 has a lip-side convex curved surface 72 which includes a surface connected to the above-described inclined surface 71 and projecting radially inward relative to the inclined surface 71.

According to the above configuration, the lip-side convex curved surface 72 has the surface connected to the inclined surface 71 and projects radially inward relative to the inclined surface 71. The lip portion 7 having the lip-side convex curved surface 72 can divide the flow of the non-combusted fuel injected from the injection nozzle 4 without decreasing the flow velocity of the non-combusted fuel very much, making it possible to efficiently propagate the non-combusted fuel into the combustion chamber 10. Further, the lip portion 7 having the lip-side convex curved surface 72 can form a section 721 including the lip-side convex curved surface 72 into a thick shape, making it possible to ensure a strength capable of withstanding a heat load applied by the non-combusted fuel injected from the injection nozzle 4.

In some embodiments, as shown in FIG. 2, the internal combustion engine 1 of the piston 3 is configured such that the above-described convex surface 93 is located on the radially inner side of an inner circumferential end 722 of the above-described lip portion 7. The inner circumferential end 722 is a section where the inner diameter of the lip portion 7 is minimum.

In this case, since the internal combustion engine 1 of the piston 3 is configured such that the convex surface 93 is located on the radially inner side of the inner circumferential end 722 of the lip portion 7, as compared with a case where the convex surface 93 is located on the radially outer side of the inner circumferential end 722 of the lip portion 7, the non-combusted fuel injected from the injection nozzle 4 can flow along the outer circumference-side curved surface 91 over a long distance. Thus, it is possible to effectively use the combustion gas in a space 10B facing the outer circumference-side curved surface 91 in the combustion chamber 10 for combustion.

In some embodiments, as shown in FIG. 4, the above-described lip portion 7 has an inner surface 73 which includes a surface connected to the above-described inclined surface 71 and extending along the direction intersecting with the inclined surface 71. In the illustrated embodiment, as shown in FIG. 4, the above-described inner surface 73 extends downward from an inner circumferential end 711 of the inclined surface 71 along the axial direction, and has a lower end gently connected to an upper end of the curved surface 914. In some other embodiments, the inner circumferential end 711 of the inclined surface 71 described above may be connected to the upper end of the curved surface 914.

In some embodiments, as shown in FIG. 1, the above-described outer circumference-side curved surface 91 has a maximum inner diameter D2 which is not greater than 0.7D1, where D1 is an outer diameter of the above-described piston 3 (an outer diameter of the outer circumferential surface 32).

In the embodiment shown in FIG. 1, 2, the outer circumference-side curved surface 91 includes a maximum inner diameter portion 913 which is a boundary between the curved surface 911 and the curved surface 912. In the embodiment shown in FIG. 4, the outer circumference-side curved surface 91 includes the maximum inner diameter portion 913 which is a boundary with the upper end of the curved surface 914, that is, the inner surface 73. The maximum inner diameter D2 of the outer circumference-side curved surface 91 is the inner diameter of the maximum inner diameter portion 913.

Further, in the illustrated embodiment, the piston 3 is provided with a cooling passage 35 where a cooling liquid flows between the outer circumferential surface 32 and the outer circumference-side curved surface 91.

According to the above configuration, the maximum inner diameter D2 of the outer circumference-side curved surface 91 is not greater than 0.7D1, where D1 is the outer diameter of the piston 3. Thus, it is possible to provide the cooling passage 35, where the cooling liquid flows, on the radially outer side of the outer circumference-side curved surface 91 in the piston 3. Providing the cooling passage 35 for the piston 3, it is possible to cool a slide portion (a portion in the vicinity of the ring groove 33 shown in FIG. 1) with the piston 3, in particular, the cylinder 2 by the liquid in the cooling passage 35. Thus, a higher output of the internal combustion engine 1 is possible.

In some embodiments, the outer diameter D1 of the above-described piston 3 is not less than 160 mm and not greater than 190 mm. The piston 3 with the outer diameter D1 satisfying the above-described condition is generally mounted on an internal combustion engine which is larger than an internal combustion engine for bicycle. As the combustion chamber 10 of the internal combustion engine 1 is large, a possibility for the non-combusted fuel injected from the injection nozzle 4 and flowing along the curved portion 9 to reach the raised portion 8 is low, and a possibility of occurrence of the region having the high fuel concentration in the space facing the curved portion 9 (the space 10A facing the inner circumference-side concave surface 92) is high. Even the piston 3 with the outer diameter D1 satisfying the above-described condition, if the curved portion 9 includes the above-described convex surface 93, it is possible to suppress occurrence of the region having the high fuel concentration in the space facing the curved portion 9. Thus, it is possible to suppress generation of soot, and to improve combustion efficiency in the combustion chamber 10.

As described above, the internal combustion engine 1 according to some embodiments includes the above-described cylinder 2, the above-described piston 3, and the above-described injection nozzle 4 configured to inject a fuel to the combustion chamber 10 divided by the cylinder 2 and the piston 3. In this case, in the internal combustion engine 1, since the curved portion 9 of the above-described piston 3 includes the above-described convex surface 93, it is possible to suppress occurrence of the region having the high fuel concentration in the space facing the curved portion 9 (the space 10A facing the inner circumference-side concave surface 92). Thus, it is possible to suppress generation of soot, and to improve combustion efficiency.

The present invention is not limited to the above-described embodiments, and also includes an embodiment obtained by modifying the above-described embodiments and an embodiment obtained by combining these embodiments as appropriate.

REFERENCE SIGNS LIST

1 Internal combustion engine
2 Cylinder
21 Hole portion
211 Inner wall surface
22 Cylinder block
23 Cylinder head
231 Bottom surface
24 Nozzle insertion hole
3 Piston
31 Top surface
32 Outer circumferential surface
33 Ring groove
34 Piston ring
35 Cooling passage
4 Injection nozzle
41 Injection hole
42 One end portion
5 Cavity
51 Bottom
52 Deepest portion
6 Outer circumferential edge portion
61 Plane surface
7 Lip portion
71 Inclined surface
711 Inner circumferential end
72 Lip-side convex curved surface
722 Inner circumferential end
73 Inner surface
8 Raised portion
81 Inclined surface
82 Ceiling surface
9 Curved portion
91 Outer circumference-side curved surface
913 Maximum inner diameter portion
92 Inner circumference-side concave surface
920 Inner circumference-side curved surface
93 Convex surface
10 Combustion chamber
10A Space facing inner circumference-side curved surface
10B Space facing outer circumference-side curved surface
11 Intake port
111 Intake hole
12 Exhaust port
121 Exhaust hole
13 Intake valve
14 Exhaust valve
D1 Outer diameter
D2 Maximum inner diameter
LA, LB Axis
R1, R2, Curvature

The invention claimed is:

1. A piston of an internal combustion engine configured to be reciprocable along an axial direction in a cylinder, comprising:
   a cavity formed to be recessed in a center of a piston top surface; and
   an outer circumferential edge portion located on a radially outer side of the cavity in the piston top surface,
   wherein the cavity includes:
   a lip portion which has an inclined surface extending obliquely downward from the outer circumferential edge portion toward a radially inner side;
   a raised portion protruding upward from a bottom of the cavity; and
   a curved portion connecting the raised portion and the lip portion, and
   wherein the curved portion includes:
   an outer circumference-side curved surface which includes a curved surface connected to the lip portion;
   an inner circumference-side concave surface which is located on the radially inner side of the outer circumference-side curved surface and includes a surface connected to the raised portion, the inner circumference-side concave surface including a deepest portion of the cavity; and
   a convex surface formed between the outer circumference-side curved surface and the inner circumference-side concave surface, as well as protruding upward, and
   wherein an inner circumferential end of the lip portion is disposed radially inward relative to a maximum inner diameter portion of the outer circumference-side curved surface,
   wherein the inner circumference-side concave surface includes an inner circumference-side curved surface curved downward into a concave shape, and
   wherein the inner circumference-side curved surface is configured to have a larger curvature than the outer circumference-side curved surface.

2. The piston of the internal combustion engine according to claim 1,
   wherein the inner circumference-side concave surface includes an inner circumference-side curved surface curved downward into a concave shape.

3. The piston of the internal combustion engine according to claim 1,
   wherein the lip portion has a lip-side convex curved surface which includes a surface connected to the inclined surface, the lip-side convex curved surface projecting radially inward relative to the inclined surface.

4. The piston of the internal combustion engine according to claim 1, wherein the piston of the internal combustion engine is configured such that the convex surface is located on the radially inner side of an inner circumferential end of the lip portion.

5. The piston of the internal combustion engine according to claim 1,
wherein the outer circumference-side curved surface has a maximum inner diameter D2 which is not greater than 0.7D1, where D1 is an outer diameter of the piston.

6. The piston of the internal combustion engine according to claim 1,
wherein the outer diameter D1 of the piston is not less than 160 mm and not greater than 190 mm.

7. An internal combustion engine, comprising:
a cylinder;
the piston according to claim 1; and
an injection nozzle configured to inject a fuel to a combustion chamber divided by the cylinder and the piston.

* * * * *